(12) United States Patent
Antonelli (10) Patent No.: US 6,662,458 B1
(45) Date of Patent: Dec. 16, 2003

(54) LEVELING ROD AND LEVELING METHOD

(76) Inventor: Paul Antonelli, 210 N. Washington, Manchester, MI (US) 48158

( * ) Notice: Subject to any disclaimer, the term of this patent is extended or adjusted under 35 U.S.C. 154(b) by 0 days.

(21) Appl. No.: 10/071,916

(22) Filed: Feb. 8, 2002

Related U.S. Application Data (60) Provisional application No. 60/267,451, filed on Feb. 8, 2001.

(51) Int. Cl.⁷ .............................. G01B 3/08; G01C 15/06
(52) U.S. Cl. ............................................. 33/293; 33/296
(58) Field of Search .................... 33/293, 294, 295, 33/296, 483, 484, 706, 707, 702, 703, 704, 809, 374, 832

(56) References Cited

U.S. PATENT DOCUMENTS

| | | | |
|---|---|---|---|
| 287,021 A | | 10/1883 | Gurley |
| 360,836 A | | 4/1887 | Wright |
| 1,220,358 A | | 3/1917 | Martin |
| 1,735,892 A | | 11/1929 | Clausen |
| 2,017,346 A | | 10/1935 | Linn |
| 2,058,998 A | | 10/1936 | Koulichkov |
| 2,580,117 A | * | 12/1951 | McMackin et al. ........... 33/293 |
| 3,374,545 A | * | 3/1968 | Monroe ....................... 33/293 |
| 4,060,909 A | | 12/1977 | Collins et al. |
| 4,203,227 A | * | 5/1980 | Giroux ....................... 33/809 |
| 4,345,382 A | | 8/1982 | Warren |
| 4,458,425 A | | 7/1984 | Hester |
| 4,471,532 A | | 9/1984 | Francis |
| 5,551,159 A | | 9/1996 | Mooty |
| 5,642,569 A | * | 7/1997 | Palmer ....................... 33/809 |
| 6,076,267 A | * | 6/2000 | Gotoh ......................... 33/293 |
| 6,085,434 A | | 7/2000 | Mitchell |

* cited by examiner

*Primary Examiner*—Christopher W. Fulton
(74) *Attorney, Agent, or Firm*—Young & Basile, P.C.

(57) ABSTRACT

The specification discloses a leveling rod, including attachments therefor, and their method of employment. The leveling rod comprises an elongated base rail member having generally opposing front and rear longitudinal surfaces, generally opposing lateral surfaces, an upper end, and a lower end comprising a foot portion, and an elongated sliding rail member having generally opposing front and rear surfaces, generally opposing lateral surfaces, and upper and lower ends. The front surface of the base rail member and the rear surface of the sliding rail member each have one or the other of complementary tongue and groove portions whereby the base and sliding rail members are slidingly interconnected in lapped relation, and the sliding rail member is further selectively fixedly positionable along the base rail member in a plurality of positions. An elongated, self-supporting measuring insert is removably mateable with the front surface of the sliding rail member.

24 Claims, 6 Drawing Sheets

LEVELING ROD AND LEVELING METHOD

RELATED APPLICATIONS

This application is related to, and claims the benefit of priority from, U.S. Provisional Patent Application Ser. No. 60/267,451, filed Feb. 8, 2001.

FIELD OF THE INVENTION

The present invention pertains to grade measurement devices, also referred to as leveling or surveying rods, and their uses, and more particularly to direct read-type leveling rods, such as are used in conjunction with laser beam or optical-sight type leveling instruments in construction applications, including excavation, setting and checking grades, measuring, and the like.

BACKGROUND OF THE INVENTION

Construction projects, including for instance road construction, home building, general excavating, etc., often require leveling tasks to be carried out by unskilled workers. Such tasks include, but are not limited to, checking pavement and concrete grades, setting concrete forms, erecting building components at varying elevations, etc.

In conventional construction projects, it has previously been known to employ leveling instruments, such as optical sights or laser-beam leveling instruments, to take elevation measurements of existing elevations, and to establish measurements for desired elevations, at various locations on the construction site. According to this methodology, the leveling apparatus is initially set up and adjusted to a level position, and the elevation of the sighting portion of the leveling apparatus is determined relative to some assumed base, sea level for instance. A leveling rod is provided, usually having a graduated measuring scale. A reading made from the thus-adjusted leveling instrument to the vertically oriented leveling rod as a lower end thereof rests on the ground at a desired location will yield a measure of the vertical distance from the elevation of the leveling instrument to the base of the leveling rod. Subtracting from this distance the height of the leveling instrument above the assumed base (e.g., sea level) yields a measure of the elevation of the ground, relative to the assumed base, at the lower end of the leveling rod. The disclosure of Martin, U.S. Pat. No. 1,220,358, is exemplary in these regards, and is incorporated herein by reference in its entirety.

Oftentimes, survey stakes or like markers are employed in construction projects to provide benchmark elevations following elevation measurements conducted in the manner discussed above. The survey stakes are provided at selected locations on the construction site where ground elevations have been previously determined. Taking the predetermined, desired elevation for that location, and a measurement of the height of the survey stake relative to the existing ground elevation, a measurement is provided on the stake that reflects the requisite change in the existing ground elevation to achieve the desired elevation.

While initial elevation surveys are commonly carried out by skilled professionals, subsequent leveling tasks (e.g., altering existing elevations to correspond to desired elevations, making subsequent elevation measurements, etc.), are carried out by relatively unskilled laborers, also using leveling rods and leveling instruments.

According to the use of conventional leveling instruments in establishing desired elevations at one or more locations for example, it is necessary for a worker to place a lower end of the leveling rod on a previously-identified benchmark, such as the aforementioned survey stake, having identified in relation thereto a known measurement for establishing the desired elevation at each location. The worker is first required to calibrate the leveling rod to the benchmark by placing the lower end of the leveling rod on the benchmark elevation and thereafter aligning the leveling instrument with a "zero" or other established starting point on the graduated measuring scale. The leveling rod is thereafter adjusted so that the known measurement reflecting the adjustment necessary to establish the desired elevation is identified on the graduated measuring scale, and necessary modifications to the elevation at the location until the measurement reflecting the desired elevation on the leveling instrument is aligned with the leveling instrument.

In the past, optical-sight type leveling instruments were employed to take visual sightings of leveling rods in conjunction with efforts to determine desired elevations such as in the manner described above. In modern construction projects, however, laser-beam leveling instruments are more frequently employed instead of optical sights. One such apparatus is described in U.S. Pat. No. 4,221,483, issued to Spectra-Physics, Inc., the disclosure of which is incorporated herein in its entirety. These laser-beam leveling instruments transmit a (usually) horizontal laser-beam across the construction site, which laser beam is detected by a laser-beam detector provided on the leveling rod carried by a construction worker. The detector is typically mounted to a bracket that is slidingly positionable along the length of the leveling rod, and is further operative to provide audible and/or visual signals indicating when the detector is positioned along the leveling rod at a height corresponding to elevation of the laser-beam. By selectively positioning the detector on the leveling rod at given measurements for establishing desired elevations, it is possible for a construction worker to use the leveling rod, for example, to determine elevations at various locations on the construction site.

One particularly common use of a leveling rod with leveling apparatus is in excavating operations, where existing terrain on a construction site is modified, either by cutting or filling as necessary, to achieve desired elevations. As indicated, the construction site is typically initially surveyed by skilled personnel who establish desired grade elevations for various locations throughout the site, and who identify these desired elevations on survey stakes or the like as measures of the amount of cut or fill necessary relative to the elevation of the stake, or as measures of the amount of cut or fill relative to some other benchmark elevation. "Cutting" or "cut" refers to the process of removing material from the existing terrain, for instance by machine or manually, until an elevation is reached that is lower than the existing elevations of the terrain; "filling" or "fill," in contrast, refers to the addition of material to the existing terrain until an elevation is reached that is higher than the existing elevation of the terrain. According to the method described above, the construction worker calibrates the measuring scale of the leveling rod to "zero" or some other starting position relative to the benchmark elevation, determines the amount of cut or fill necessary at a given location, for instance as directed by a stake measurement, identifies a position along the measuring scale of the leveling rod corresponding to the amount of cut or fill (either by positioning a visual sighting indicator, when using optical-sight type leveling instruments, or, when laser-beam leveling instruments are employed, by adjusting the position of the laser beam detector), and adjusts the elevation of the terrain as necessary until the position on the leveling rod corresponding to the amount of cut or fill (and hence the desired elevation) is aligned with the leveling instrument.

For relatively unskilled laborers, conventional methods for employing leveling rods and leveling instruments such as described above are unduly complicated, since the determination of one or more desired elevations relative to a previously sighted measurement commonly requires mathematical computation. In the exemplary circumstance of grading the front porch and steps of a residential construction, the task of checking elevations for each step relative to a sighted elevation measurement made for the top of the porch would necessitate adding to that measurement the predetermined height of each step relative to the top of the porch. If any of these calculations is made in error, subsequent measurements made of the step elevations will be incorrect. And in excavating operations, a construction worker may improperly add or subtract one or more cut or fill measurements in relation to the measuring scale provided on the leveling rod, thus yielding an improper elevation at the measured location.

A further problem with conventional leveling rods, already mentioned in passing, is their complex and relatively fragile construction. In these regards, the leveling rod of U.S. Pat. No. 4,392,308, the disclosure of which is incorporated herein in its entirety, is exemplary. That device is characterized by a flexible, endless band comprising a graduated scale, the band mounted for circumvolutionary movement around an elongated rod. A slide mechanism is mounted for longitudinal sliding movement on the elongated rod. The slide mechanism includes a clamp for securing the mechanism to the endless belt to prevent the belt from moving. When the flexible band is broken, as can frequently occur during normal use in a construction environment, the device must be disassembled for repair. Moreover, sand, dirt, cement, and other particulates common to construction environments can foul the mechanism that provides for circumvolutionary movement of the endless band. And in cold climates, ice can hinder operation of the slide mechanism that secures the endless belt against movement.

It would therefore be desirable to provide a leveling rod for conducting leveling tasks, and a method of employing the same, that is at once-economical to manufacture, robust yet simple in design, and uncomplicated in its method of operation.

SUMMARY OF THE INVENTION

The present invention addresses and solves the problems discussed above, and encompasses other features and advantages, by providing a leveling rod comprising an elongated base rail member having generally opposing front and rear longitudinal surfaces, generally opposing lateral surfaces, an upper end, and a lower end comprising a foot portion, and an elongated sliding rail member having generally opposing front and rear surfaces, generally opposing lateral surfaces, and upper and lower ends. An elongated, self-supporting measuring insert is removably mateable with the front surface of the sliding rail member. The front surface of the base rail member and the rear surface of the sliding rail member each have one or the other of complementary tongue and groove portions whereby the base and sliding rail members are slidingly interconnected in lapped relation; and the sliding rail member is further selectively fixedly positionable along the base rail member in a plurality of positions.

According to one feature of this invention, at least one of the lateral sides of the sliding rail member further comprises a longitudinally extending, lateral track adapted to slidingly receiving therein a bracket mounting a laser-beam detector, whereby the inventive leveling rod may be used in conjunction with conventional laser-beam leveling instruments.

A method is also disclosed for employing the inventive leveling rod in conjunction with a leveling instrument to establish at least one predetermined elevation relative to a benchmark elevation at one or more locations on a construction site without the need for mathematical computations. According to this method, a leveling rod is provided comprising elongated base and sliding rail members slidingly interconnected in lapped relation, the sliding rail member being selectively fixedly positionable along the base rail member in a plurality of positions, the base rail member having generally opposing front and rear longitudinal surfaces, an upper end, and a lower end comprising a foot portion, and the sliding rail member having generally opposing front and rear surfaces, and upper and lower ends. At least one elongated, self-supporting, blank measuring insert removably mateable with the front surface of the sliding rail member is also provided, the measuring insert having indicia identifying the relative positions of the benchmark elevation and the at least one predetermined elevation, thereby doing away with the performance of any computation by the leveling rod user. Per this method, the leveling rod is calibrated to the benchmark elevation by positioning the foot portion of the leveling rod on the benchmark elevation, and slidingly moving the sliding rail member along the base rail member until the indicia on the measuring insert corresponding to the benchmark elevation is aligned with the leveling instrument, either visually or through the use of a laser-beam leveling instrument. The at least one predetermined elevation may thereafter be established at one or more locations on the construction site by positioning the foot portion of the leveling rod on a support surface at each of the one or more locations, and modifying the elevation of the support surface until the indicia on the measuring insert corresponding to the at least one predetermined elevation is aligned with the leveling instrument, again as may be determined via optical or laser-beam leveling instruments.

Per one feature of this inventive method, the indicia on the measuring insert may comprise non-numeric indicia, alphabetic indicia, or symbolic indicia.

According to one feature of this invention, a cut attachment for a leveling rod, including for example the leveling rod of this invention, is provided to automatically establish a lower elevation at one or more locations on a construction site using a known measurement provided for establishing a higher elevation in relation to a benchmark elevation, where the distance between the lower and higher elevations is constant. The cut attachment includes first and second hingedly connected longitudinal segments, and is characterized by a folded condition, wherein the first and second segments are arranged in lapped relation, and an unfolded condition, wherein the first and second segments are arranged end-to-end. The first segment is adapted for sliding interconnection with a leveling rod, and the first segment is further selectively fixedly positionable along the leveling rod in a plurality of positions. A measuring scale may also be provided on the second segment, whereby a determination of the length of the second segment depending below the foot portion of the leveling rod is more easily determined. Per one feature of this inventive cut attachment, the first and second segments are each provided with complementary, removably-interengageable elements that are interengaged in the folded condition of the cut attachment. These removably-interengageable elements may, according to one embodiment of this invention, comprise a magnet provided on one of the first or second segments, and a magnetically attractable member provided on the other of the first or second segments.

A method for employing the inventive cut attachment is also disclosed, according to which methodology a leveling instrument and a single leveling rod may be employed to automatically establish a lower elevation at one or more locations on a construction site using a known measurement provided for establishing a higher elevation in relation to a benchmark elevation, where the distance between the lower and higher elevations is constant. According to this method, a leveling rod is provided having a measuring scale and a lower end comprising a foot portion. The first segment of the cut attachment is fixedly positioned along the leveling rod such that, in the folded condition of the cut attachment, the second segment does not extend beyond the lower end of the leveling rod, and in the unfolded condition of the cut attachment the second segment extends beyond the lower end of the leveling rod a distance that is equal to the distance between the higher and lower elevations. With the cut attachment in the folded condition thereof, the leveling rod is calibrated with the leveling instrument by placing the foot of the leveling rod on the benchmark elevation, and aligning the leveling instrument with a position on the measuring scale corresponding to a starting position. Thereafter, a position corresponding to the known measurement for establishing the higher elevation is identified on the measuring scale of the leveling rod. With this position identified, the lower elevation may be established at one or more locations on the construction site by placing the cut attachment in the unfolded condition thereof, positioning the foot portion of the second segment on a support surface at the one or more locations, and modifying the elevation at the one or more locations as necessary until the position on the measuring device corresponding to the known measurement for establishing the higher elevation is aligned with the leveling instrument. According to this methodology, the lower elevation may be easily established at a plurality of locations on the construction site where a known measurement is provided to establish a higher elevation in relation to a benchmark elevation by simply calibrating the leveling rod to the benchmark elevation with the cut attachment in the folded condition thereof, identifying the known measurement for establishing the higher elevation, and then unfolding the cut attachment and aligning the known measurement for establishing the higher elevation with the leveling device.

The specification also discloses a measuring attachment for use in conjunction with an elongated leveling rod of the type having a measuring scale, such as the leveling rod of this invention, the measuring attachment comprising a bracket mountable to the leveling rod for longitudinal sliding-movement there along. The bracket, which may comprise a commercially available bracket such as, for example, those mounting laser-beam receivers, includes means for identifying a first position on the measuring scale corresponding to a measurement for establishing a first elevation on the measuring scale. The measuring attachment further includes an elongated rail member extending from the bracket in a direction generally parallel to the axis of movement of the bracket along the leveling rod, the rail member including means for identifying at least a second position that is different from the first position, the means for identifying the at least second position being selectively moveably positionable along the length of the rail.

According to one feature of this invention, the elongated rail member is removably connectable to the bracket.

According to still another feature, the elongated rail member is alternately removably connectable to the bracket in at least a first position, wherein the rail member extends away from the bracket in a first direction generally parallel to the axis of movement of the bracket, and at least a second position, wherein the rail member extends away from the bracket in a second direction.

Means for using the measuring attachment are described whereby both a leveling instrument and a single leveling rod are employed to automatically establish at least a second elevation at one or more locations on a construction site using a known measurement provided for establishing a first elevation in relation to a benchmark elevation, where the distance between the first and second elevations is constant. The method comprises the steps of providing a leveling rod having a lower end comprising a foot portion, and a measuring scale, and further providing a measuring attachment for the leveling rod, the measuring attachment comprising a bracket mountable to the leveling rod and adapted for longitudinal sliding-movement there along, the bracket including means for identifying a first position on the measuring scale corresponding to a measurement for establishing a first elevation, and an elongated rail member extending from the bracket in a direction generally parallel to the axis of movement of the bracket along the leveling rod, the rail member including means for identifying at least a second position on the measuring scale that is different from the first position, the means for identifying the at least second position further being selectively moveably positionable along the length of the rail. The means for identifying the at least second position along the measuring scale are fixedly positioned a predetermined distance from the means for identifying the first position that corresponds to the constant distance between the first and second elevations. The leveling rod is calibrated by placing the foot of the leveling rod on the benchmark elevation, and adjusting the means for identifying the first position to a position on the measuring scale corresponding to a starting position. Thereafter, the means for identifying the first position are adjustably positioned to a position on the measuring scale corresponding to the known measurement for establishing the first elevation in relation to the benchmark elevation. The at least second elevation may thereafter be established at one or more locations by adjusting the means for identifying at least a second position to a position on the measuring scale corresponding to the known measurement for establishing the first elevation in relation to the benchmark elevation, positioning the foot of the leveling rod on a support surface at the one or more locations, and modifying the elevation at the one or more locations as necessary until the means for identifying at least a second position are aligned with the leveling instrument.

BRIEF DESCRIPTION OF THE DRAWINGS

These and other objects, features and advantages of the present invention will become apparent upon reference to the following description and drawings, in which.

DESCRIPTION OF THE ILLUSTRATED EMBODIMENT

Figure 1:
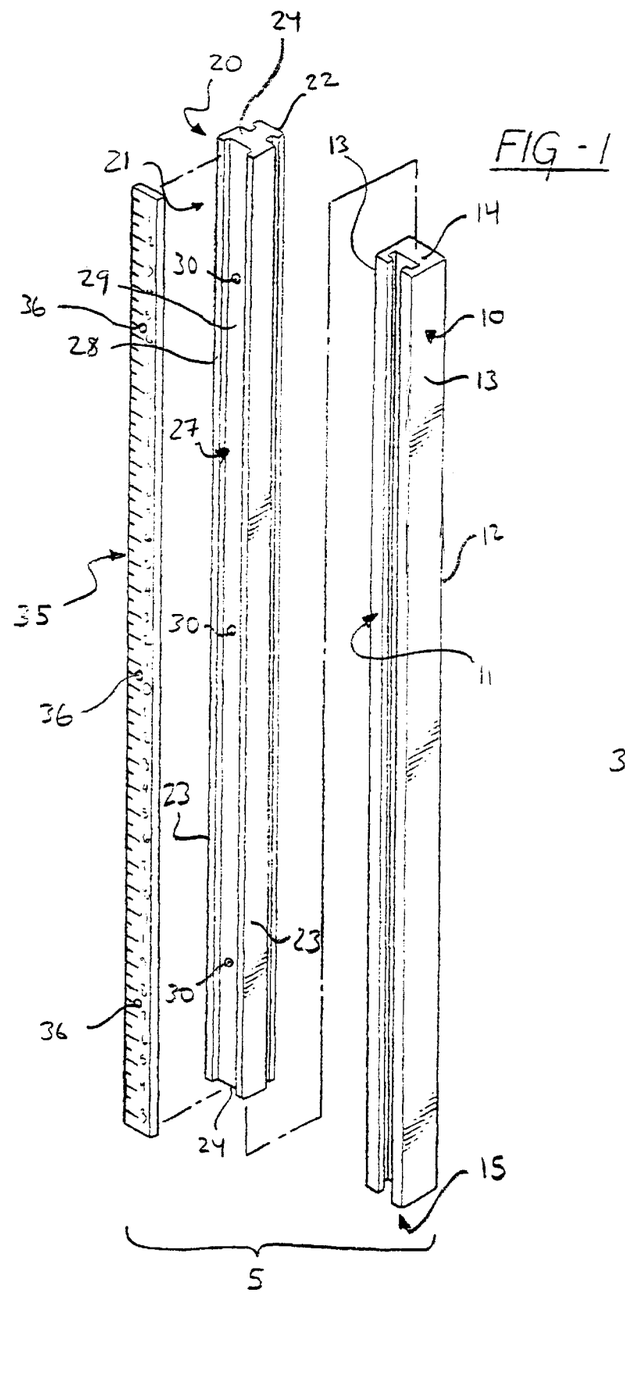
FIG. 1 is an exploded perspective view of the leveling rod of the present invention.
Figure 2:
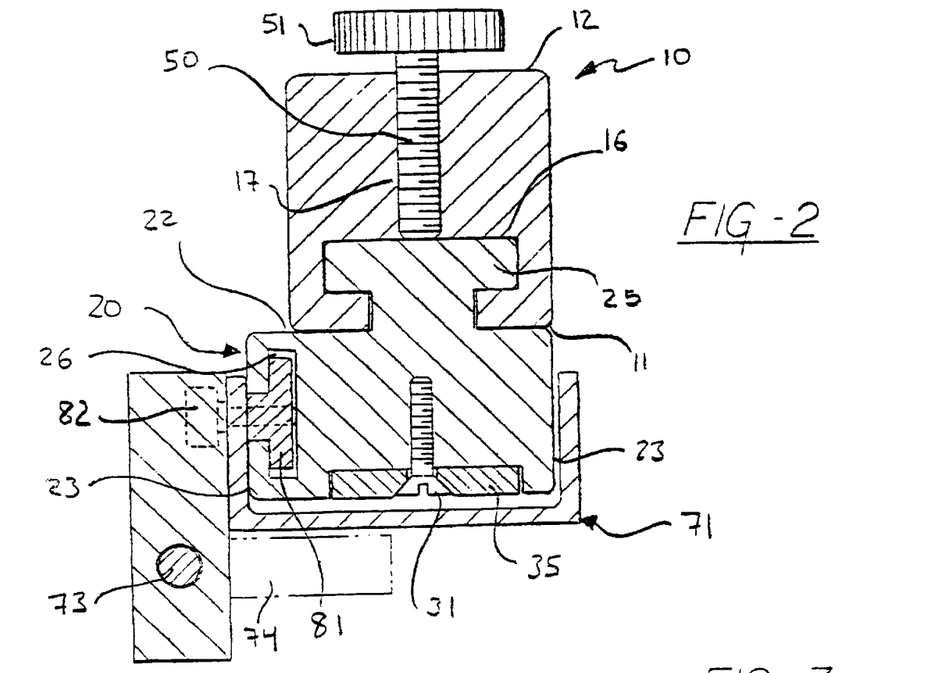
FIG. 2 is a cross-section of the leveling rod of the present invention according to one embodiment thereof, showing the rail members in an interconnected condition.

Referring now to the drawings, wherein like numerals indicate like or corresponding parts, the present invention will be seen to generally comprise a leveling rod 5 including an elongated base rail member 10, an elongated sliding rail member 20 slidingly interconnected in lapped relation with the base rail member 10 and selectively fixedly positionable along the base rail member 10, and an elongate, self-supporting measuring insert 30 removably mateable with the sliding rail member 20. (FIGS. 1 and 2.)

The base rail member 10 includes generally opposing front 11 and rear 12 surfaces, generally opposing lateral surfaces 13, an upper end 14, and a lower end 15 comprising a foot portion. The sliding rail member 20 likewise includes generally opposing front 21 and rear 22 surfaces, generally opposing lateral surfaces 23, and upper and lower ends 24.

The base 10 and sliding 20 rail members are preferably slidingly interconnected by complementary tongue 25 and groove 16 portions provided on the rear surface 22 of the sliding rail member 20 and the front surface 11 of the base rail member 10, respectively, all as shown. As illustrated, the tongue and groove style interconnection comprises dovetail-style tongue and groove portions. Each of the tongue 25 and groove 16 portions are preferably coextensive with the respective rail members, in order that the a portion of the sliding rail member 20 may be extended beyond an end of the base rail member 10 as necessary in operation of the leveling rod of this invention. The tongue and groove interconnection will be appreciated to provide for relative sliding movement of the base 10 and sliding 20 rails, while simultaneously prohibiting any undesirable radial separation of these components. Of course, the respective tongue 25 and groove 16 portions shown may be provided on either of the base 10 and sliding 20 rail members, as desired. It will of course be understood that the illustrated tongue and groove interconnection, while a presently preferred embodiment, is not limiting of the present invention; and it is contemplated that other known means may be substituted for interconnecting the base 10 and sliding 20 rail members in order to facilitate their sliding interrelation.

Each of the base 10 and sliding 20 rail members are preferably manufactured of a suitably durable material so as to withstand the rigors of everyday use, particularly in a construction environment. The rail members 10, 20 of the illustrated embodiment are manufactured from a durable polymer, such as polyethylene or the like, that is also characterized by a naturally low coefficient of friction so as to promote easy sliding movement of the sliding rail member 20 along the base rail member 10. Other suitably durable materials, including wood, metal, etc. may of course be substituted for construction of the inventive device. While not required, the base 10 and sliding 20 rail members as shown are of one-piece construction, for instance being manufactured by molding, machining, extruding, etc., this configuration lending itself to the simple and robust design of the present invention.

Though not necessary, the base rail member 10 may further include a rigid metal insert (not shown) overlying and substantially coextensive with the groove portion 16 thereof, this rigid metal insert comprising a metal sheet having a cross-section comparable to the cross-section of the groove portion 16. According to this embodiment of the inventive leveling rod, the rigid metal insert will serve to reinforce the groove portion 16, and so to prevent any distortions in the shape thereof that might otherwise interfere with sliding movement of the sliding rail member 20 along the base rail member 10.

It will be appreciated that the base 10 and sliding 20 rail members may be of any desired dimensions, though the leveling rod of this invention is preferably comfortably hand-held, with vertical dimensions sufficient to meet a wide variety of leveling tasks without being too cumbersome for a single worker to handle and operate. Of course, the dimensions of the device do not form part of the present invention, and may be modified to suit particular needs and applications, all according to individual desires.

In instances where the present invention is to be employed in conjunction with laser leveling apparatus, one or more of the rail members 10, 20 may optionally be provided with a longitudinally extending, lateral track for slidingly receiving therein a conventional sliding bracket mounting a laser-beam detector. As shown particularly in FIG. 2, it is preferred to provide such a lateral track 26 on at least a lateral surface 23 of the sliding rail member 20, so that the laser-beam detector (not illustrated) may be slidingly positioned along the length of the sliding rail member 10 to identify one measurements along the measuring insert 30. Most preferably, the longitudinally extending track 26 is formed integrally with the sliding rail member 20, as illustrated. Laser-beam detector mounting-brackets adapted for sliding receipt in a track of the type illustrated are commercially available from numerous suppliers including, by way of example, SPECTRA PRECISION (Part Nos. 1077, 1274, and 1275), TOPCON (Part Nos. LS-30, LS-50B, LS-70A, and LS-70B), and NIKON (Part Nos. 3 and DS-30). Alternatively, the leveling rod of this invention may be used with other conventionally available detector mounting-brackets, including those comprising mechanically clamping platforms that can be selectively clamped along the length of the leveling rod in known fashion. An exemplary detector bracket of this type is commercially available from SPECTRA-PHYSICS/LASERPLANE, INC., Part No. P/N 0077-5000. Of course, the optional track may not be desired when a mechanically-clamping bracket is to be used with the leveling rod of this invention.

Still referring to FIG. 2, means are provided for selectively fixedly positioning the sliding rail member 20 along the base rail member 10 in a plurality of positions. Preferably, these means comprise providing one of the said rail members 10 or 20 with a locking screw 50 or the like that is selectively adjustable to engage the other of the said rail members 10 or 20 and bring the tongue 25 and groove 16 portions into friction-fit engagement in order to prevent the free sliding movement of the rail members 10, 20 relative to each other. In the illustrated embodiment, the base rail member 10 most preferably includes a threaded passageway 17 extending transversely through the rear surface 12 thereof and into the opposing groove portion 16 for slidingly receiving the complementary tongue portion 25 of the sliding rail member 20. The locking screw 50 is threadingly receivable in the passageway 17 and, by manual rotation thereof using a knob 51, is adjustably extendable into the groove portion 16 as desired to impact the tongue portion 25 of the sliding rail member 20 and so urge the tongue 25 and groove 16 portions into a frictional engagement that prevents relative sliding movement. Of course, the locking screw mechanism as shown and described may be provided on either of the base 10 or sliding 20 rail members to the same end, as desired. Likewise, alternate means may also be employed to fix the base 10 and sliding 20 rail members against relative sliding movement including, without limitation, one or more spring clamps with jaws for capturing the base 10 and sliding 20 rail members simultaneously, a cam lever, a spring-loaded locking pin, etc.

Figure 3:
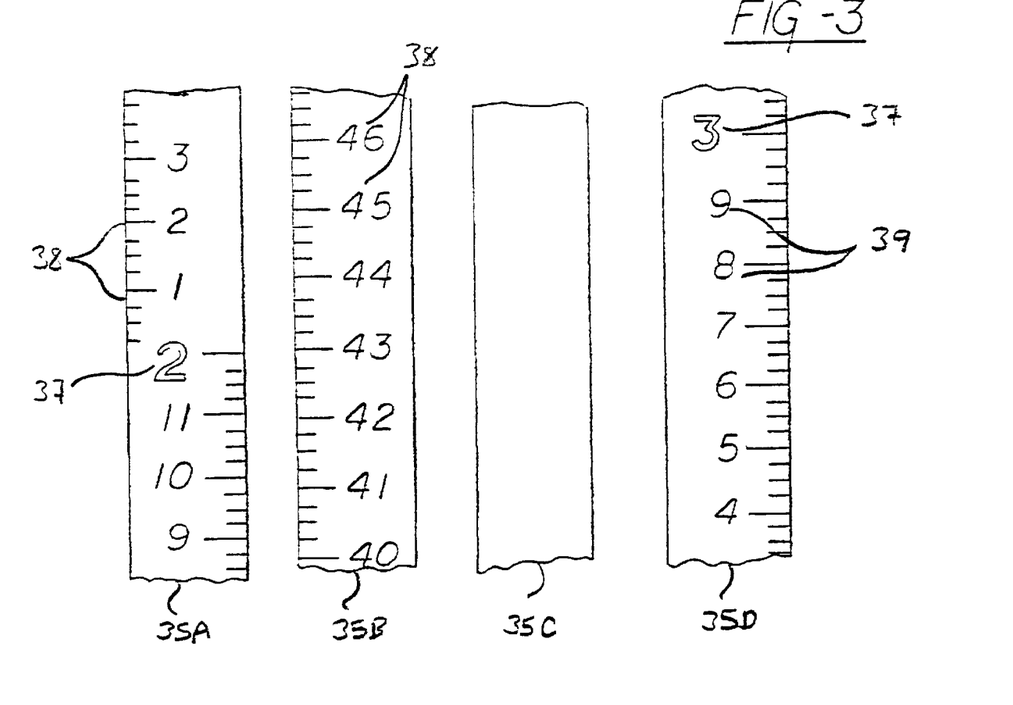
FIG. 3 is a partial elevation of several self-supporting measuring inserts adapted for use with the leveling rod of the present invention.

Referring now to. FIGS. 1–3, the sliding rail member 20 will be seen to include an outwardly facing, longitudinally extending channel 27 defined by sidewalls 28 and an intermediate surface 29. The channel 27 is dimensioned to removably receive therein one of a plurality of self-supporting measuring inserts 35 appropriate to a given leveling task. The measuring inserts 35 may be manufactured of wood, metal, plastic, or other suitably durable, self-supporting material, and are preferably of generally planar, rectangular dimensions, comparable to a conventional yardstick, for example. In the illustrated embodiment, the channel 27 includes a series of longitudinally spaced-apart, threaded bores 30. Each bore has a counterpart bore 36 provided along the length of the measuring insert 35, each such bore 36 being spaced for coaxial alignment with one of the bores 30. Each set of corresponding bores 30, 36 are dimensioned to receive a fastener 31, such as a screw, bolt, etc. for removably securing the measuring insert 35 to the sliding rail member 20. By the foregoing arrangement, it will be appreciated that a virtually limitless number of distinct, self supporting measuring inserts may be provided for selective use with the present inventive leveling rod to adapt the same to any leveling task by simply interchanging such measuring inserts 35 as necessary. Without limitation, an exemplary series of interchangeable measuring inserts is shown in FIG. 3 to include an insert 35A graduated in feet 37 and inches 38, an insert 35B graduated in inches 38, a blank insert 35C customizable, as desired, according to a given leveling task, and an insert 35D graduated in feet 37 and tenths of feet 39.

Figure 4:
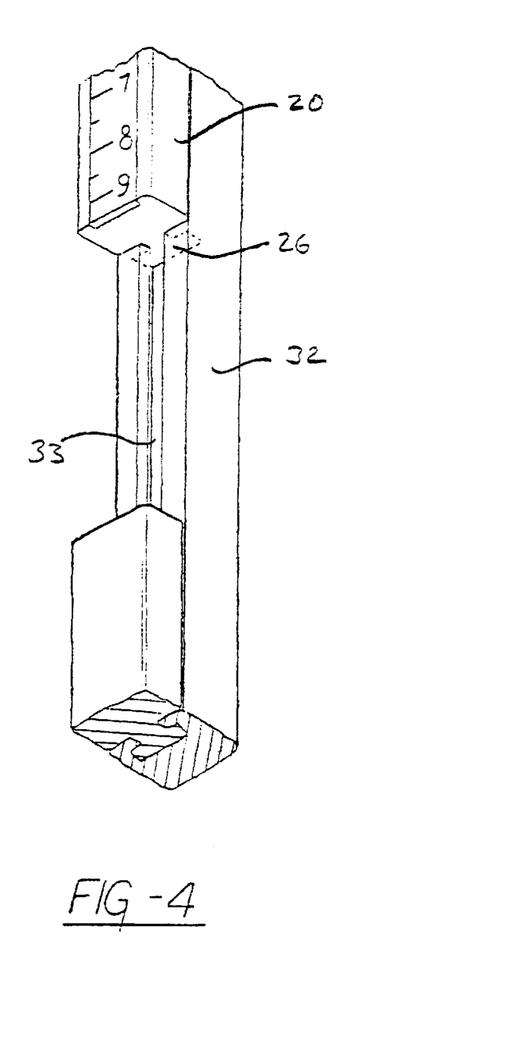
FIG. 4 is a partial perspective view depicting the measurement extension rail of the present invention slidingly interconnected with the sliding rail member.
Figures 5, 6:
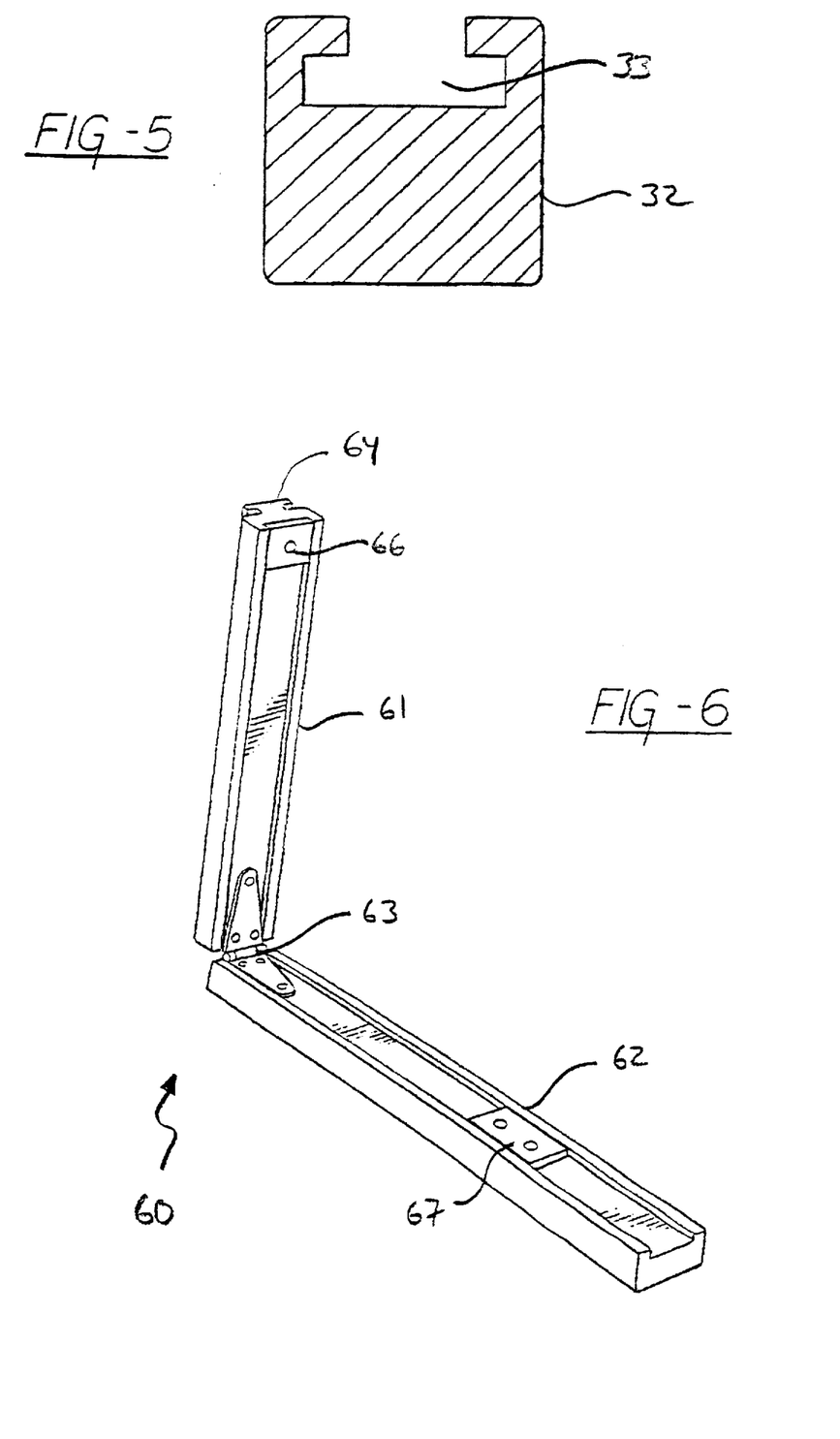
FIG. 5 is a cross-section of the measurement extension rail of the present invention.
FIG. 6 is a perspective view of the cut attachment of the present invention, shown in a partially folded condition.

Turning now to FIGS. 4 and 5, the effective measuring length of the leveling rod of the present invention is easily increased by the provision of one or more measurement extension rail members 32, each such extension rail member 32 being adapted for interconnection with the next lowest rail of the device. Thus, for example, the illustrated extension rail member 32 is substantially like the base rail member 10 in cross section, including a longitudinal groove portion 33 for slidingly receiving therein the complimentary tongue portion 26 of the sliding rail member 20. By providing any desired number of measurement extension rail members 32 so configured, each successive extension rail member adapted for interconnection with the preceding extension rail member, it will be appreciated that the effective measuring length of a leveling rod in accordance with the present invention can be infinitely increased to meet desired applications.

While it will be appreciated that, depending upon the measuring insert employed, the present inventive leveling rod may be used in a conventional manner, certain novel features of this inventive device and its method of employment may be best understood with reference to specific operative examples.

To reduce or eliminate measuring errors by unskilled laborers, especially in a construction environment, the present invention provides a simple methodology for employing the leveling rod thereof. According to this method, the leveling rod is used in conjunction with at least measuring insert having a scale wherein a "zero" or starting point is provided intermediately of indicia, numeric or otherwise, progressing oppositely in either direction from the starting point along the measuring insert. As indicated, these indicia may comprise a conventional numeric scale, indicating for instance feet and inches progressing from zero in either direction. Alternatively, however, it is also contemplated by this disclosure that the indicia may define as "zero" a benchmark location, and represent in either direction therefrom a series of desired, pre-determined-grades or elevations. Most preferably, these indicia, whether numeric or otherwise are arranged so that measurements made on the scale progressing upwardly from the starting point represent cut sections, while those progressing downwardly represent fill sections. With the device of this invention so configured, a construction worker, using the device for example in an excavating operation with a laser-leveling instrument, places the foot of the base rail member on the ground at a benchmark elevation and, with a conventional laser-beam receiver mounted to the leveling rod and positioned proximate the zero or starting point of the measuring insert, slidably moves the sliding rail member until the receiver emits an audible signal indicating that the zero or starting point is aligned with the reference plane of the leveling apparatus. Moving to a remote location in the construction site previously identified for excavation, either cut or fill, of a predetermined measure, the construction worker urges the receiver on the sliding rail member in a direction appropriate for the excavation operation (up or down on the rail for cut or fill, respectively) and a distance corresponding to the predetermined measure. Thus, for example, if a previously surveyed location was identified, for instance via stake, for a 3 foot fill, the worker would move the receiver form its position proximate the zero location downwardly to a position proximate a 3 foot mark on the measuring insert. As the location is subsequently filled, the worker would periodically place the foot of the base rail member on the location until an audible and/or visual signal was issued by the laser-beam receiver to indicate that the receiver was aligned with the laser-beam leveling instrument, and thus that the location had been filled to a height equivalent to a 3 foot increase in the elevation at that location.

Figure 3A:
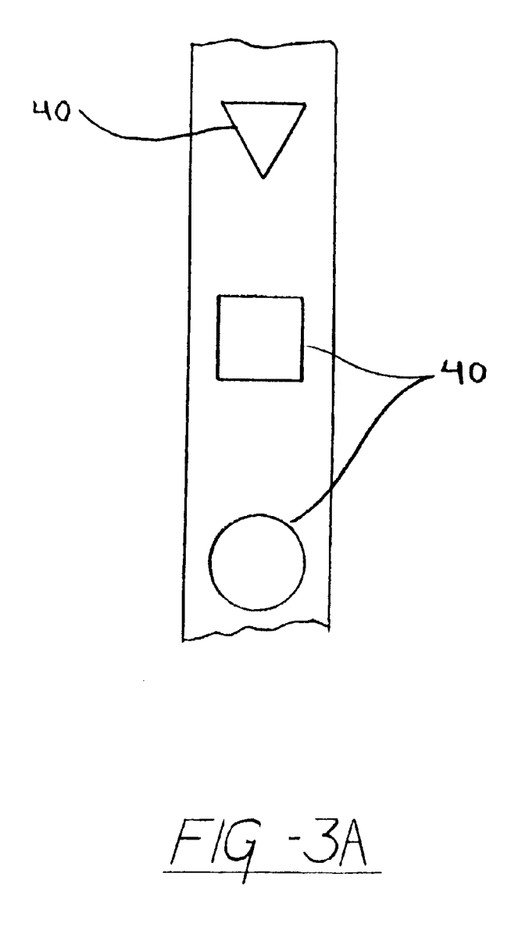
FIGS. 3A and 3B show partial elevations of embodiments of blank measuring inserts adapted for use with the leveling rod of the present invention.
Figure 3B:
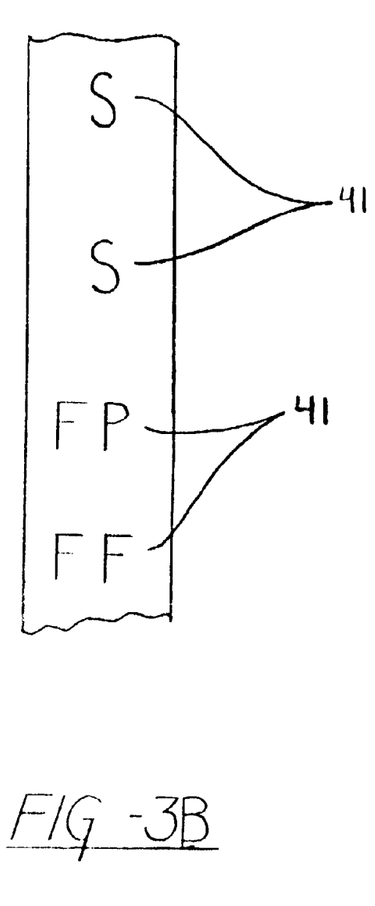

In an exemplary home construction application, the method of employing the present inventive leveling rod with a blank measuring insert will be better understood. According to this application, a worker is provided with an initially blank measuring insert for the leveling rod wherein the insert has been previously marked, presumptively by a skilled individual, with the predetermnined, relative distances between desired elevations, including for instance the finished floor of the home, a front porch, and a series of steps. While numerical indicia may be used, these desired elevations are most preferably identified on the measuring insert not as relative distances in numerical units, such as inches, feet, etc., but rather by name, symbol 40, or suitable acronym 41 (FIGS. 3A–3B). Thus, for instance, the measuring insert of this example would most preferably identify the relative distances between the finished floor, "FF," the front porch, "FP," and the steps, "S" (FIG. 3B). In checking for the accuracy of the elevations of these various locations during construction, a worker need simply place the foot of the base rail on a zero or starting point, the finished floor ("FF") in this example, and, with a laser-beam receiver mounted to the rod proximate the "FF" mark on the measuring insert for example, slide the slidable rail member relative to the base rail until the receiver produced an audible signal indicating that the receiver was aligned with the laser beam. With the leveling rod thus calibrated to the desired reference elevation, the base and sliding rail members are then fixed against relative movement, and the receiver-mounting bracket is slidingly adjusted to the next elevation to be checked, for instance the elevation of the top of the front porch ("FP"). If an audible signal is produced by the receiver after the foot of the base rail member is placed on the top surface of the front porch, then confirmation is provided that the elevation of this surface is correct in relation to the other elevations. Subsequent grade measurements performed for the other locations, such as the steps, are then performed in a similar manner. It will be appreciated that, by employing a blank measuring insert with the leveling rod of this invention in the manner described, the unskilled laborer need perform no mathematical computations in any associated grading task, thus significantly reducing the potential for the introduction of error in performing the task.

Figures 7, 8:
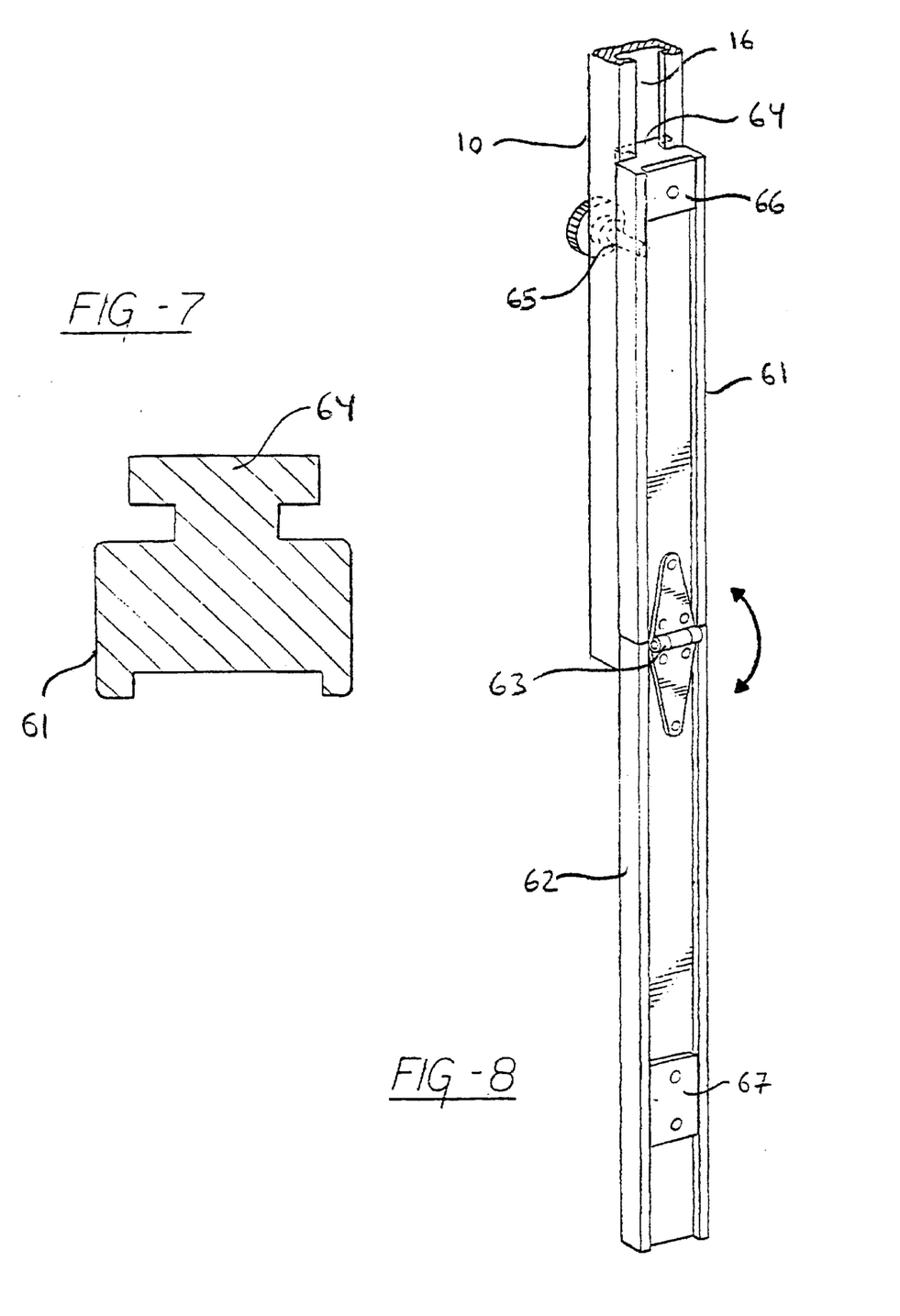
FIG. 7 is a cross-section of the first segment of the cut attachment of FIG. 6.
FIG. 8 is a perspective view of the cut attachment of the present invention, shown in interconnected relation with the base rail member of the leveling rod.

Referring now to FIGS. 6–8, the leveling rod of this invention may be adapted, by the provision of a cut attachment 60, for automatically establishing a lower elevation at one or more locations on a construction site using a known measurement for establishing a higher elevation in relation to a benchmark elevation, where the distance between the lower and higher elevations is constant.

The cut attachment 60 includes first 61 and second 62 longitudinal segments interconnected at adjacent ends thereof by a hinge 63. The cut attachment 60 is characterized by a folded condition (not shown), wherein the first 61 and second 62 segments are arranged in lapped relation, and an unfolded condition (FIG. 8), wherein the first 61 and second 62 segments are arranged end-to-end. Each of the first 61 and second 62 segments comprises an elongated length of rail, manufactured for instance from a suitably durable polymer. A measuring scale (not shown) may be provided on the second 62 segment, whereby, during use of the cut attachment 60 according to the methodology described elsewhere herein, a determination of the length of the second 62 segment depending below the foot portion 15 of the base rail member 10 is more easily determined. Alternatively, this length may be established using a separate measuring device, for instance a yardstick, tape measure, etc.

The first 61 segment is adapted for sliding interconnection with the base rail member 10 proximate the lower end 15 thereof, and is further fixedly positionable along the base rail member 10 in a plurality of positions. In the example of the illustrated embodiment, the first 61 segment includes a tongue portion 64 complementary to the groove portion 16 of the base rail member 10. So that the first segment 61 may be fixedly positioned along the base rail member 10 in a plurality of positions, a second locking screw 65 is provided on the base rail 10 and adapted to engage the first 61 segment of the cut attachment 60. The operation and configuration of this locking screw 65 is substantially as described for the locking screw 50.

To retain the cut attachment 60 in its folded, lapped condition, it is preferred that the first 61 or second 62 segments be provided with complementary, removably-interengageable elements that are interengaged in the folded condition of the cut attachment 60. In the illustrated form of this invention, these interengageable elements comprise a magnet 66 provided on the first 61 segment, and a magnetically attractable member 67, such as the illustrated steel plate, provided on the second 62 segment and positioned thereon so as to be arranged oppositely of the magnet 66 in the folded configuration of the cut attachment 60.

As indicated, the cut attachment 60 may be employed, in conjunction with a leveling rod, including the leveling rod of this invention, and a conventional leveling instrument (such as, for instance, an optical-sight type or laser-beam leveling instrument), to automatically establish a lower elevation at one or more locations on a construction site using a known measurement for establishing a higher elevation in relation to a benchmark elevation, where the distance between the lower and higher elevations is constant. In order to better understand this manner of using the cut attachment 60, an exemplary pavement construction application will be described.

Typical pavement will include both a traffic surface consisting of a given depth of pavement material, such as asphalt, concrete, etc., and a marginal curb, of the same or different material, of slightly higher elevation than the traffic surface. These different elevations will oftentimes be reflected in survey markers staked along the path the pavement will follow, the top of each survey marker defining a benchmark elevation at that location, and each survey marker further identifying a measurement for establishing an elevation, for instance that of the curb height, relative to the benchmark elevation. Thus, for instance, the height of the curb may be defined relative to a survey stake or other marker as a given amount of fill or cut in order to insure proper excavation. The same will be true for the depth of the pavement below the traffic surface. Taking as an example a survey stake identifying the elevation of a proximate curb height to be 3 inches greater than the benchmark elevation for that particular stake, the construction worker using the leveling rod of this invention would calibrate the leveling rod to the benchmark elevation of the stake using the leveling instrument, in this instance a laser-leveling instrument. Such calibration proceeds by placing the foot portion of the base rail on the stake, placing the laser receiver proximate the zero or other defined starting-point indicia on the measuring device, and moving the sliding rail relative to the base rail until the receiver produces audible and/or visual signals indicating that the zero or starting-point is calibrated to the height of the reference plane produced by the laser leveling apparatus. The position of the sliding rail member along the base rail member is subsequently fixed, and the receiver is advanced downwardly along the measuring device 3 inches to mark the elevation for the curb. When the leveling rod is placed proximate the location of the curb, audible and/or visual signals generated by the receiver will indicate that the bottom of the leveling rod is at the desired elevation of the curb. Assuming now in connection with this same example a predetermined lower elevation with a depth of pavement of 8 inches below the desired elevation of the curb, a worker can secure the cut attachment to the base rail member so that, using gradations on the measuring insert of the second length of the cut attachment (provided in inches in this example), 8 inches of the second length of the cut attachment extends beyond the lower end of the base rail member. This 8 inch extension represents the constant 8 inch distance between the higher elevation, in this example the height of the curb, and the lower elevation, in this example given as the depth of pavement. By thereafter placing the cut attachment in the unfolded condition thereof, and employing the bottom of the second segment of the cut attachment as the base or foot of the leveling rod, it will be appreciated that the elevation of the depth of the pavement at the location can be established without the necessity of further adjusting the position of the receiver from the position determined for the curb elevation as discussed above and, accordingly, without the need for the worker to perform mathematical calculations to correctly position the receiver at a position along the measuring scale corresponding to the appropriate depth of pavement relative to the known measurement for establishing the curb height at the location.

By pivoting the cut attachment into its aforementioned folded condition, such that the second segment does not extend beyond the lower end of the base rail member, it will be appreciated that the worker can calibrate the leveling rod to benchmark elevations at various locations throughout the construction site, adjust the receiver to identify a position on the measuring scale corresponding to the known measurement provided at each such location, and thereafter place the cut attachment in its unfolded condition to repeatedly establish the elevation of the lower elevation using the benchmark elevation and the known measurement, all without having to perform mathematical computations such as are required in conventional methodologies.

Figure 9:
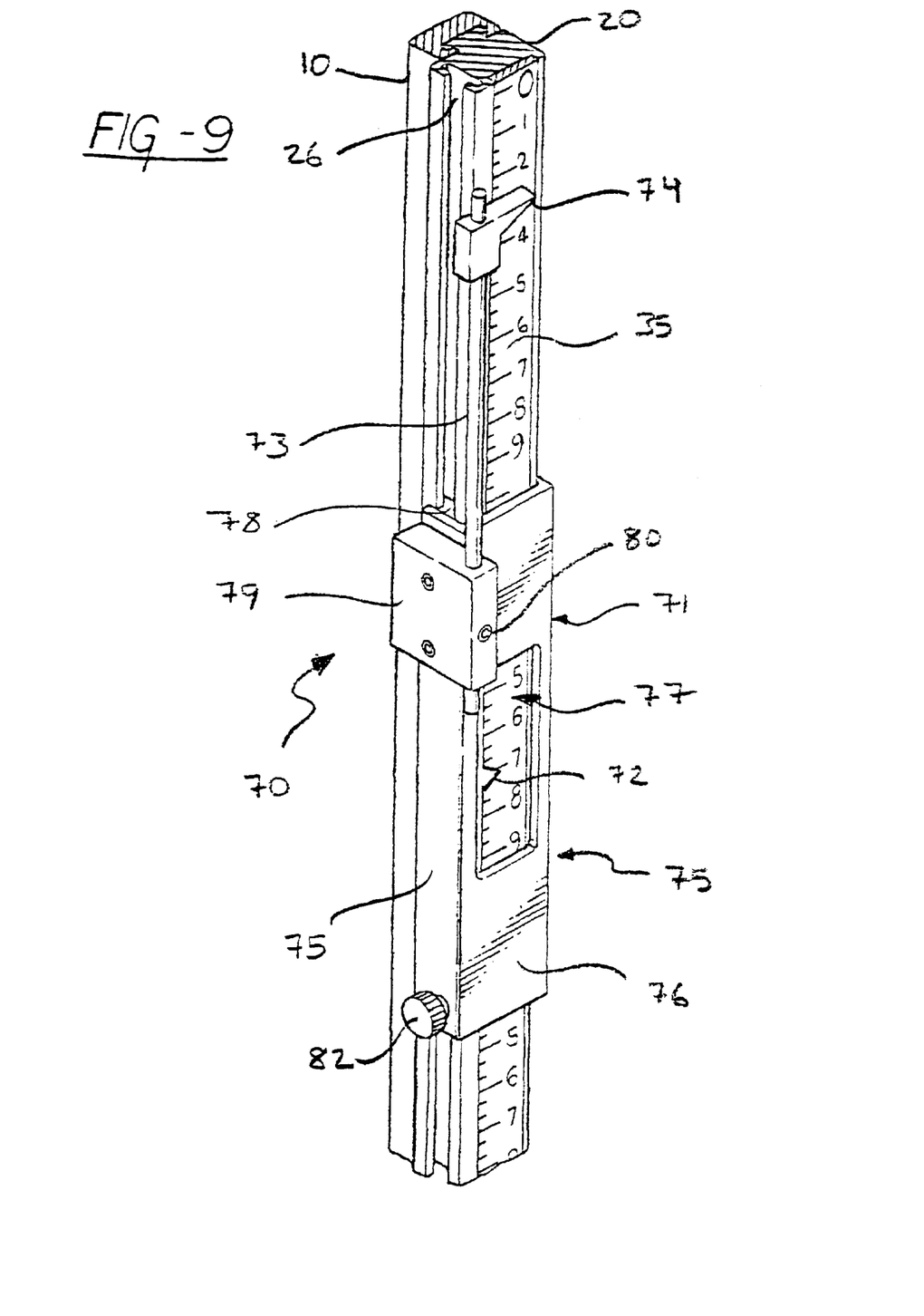
FIG. 9 is a perspective view of the measuring attachment of the present invention.

Turning next to FIGS. 2 and 9, the leveling rod of this invention may further be provided with a measuring attachment 70 to automatically establish at least a second elevation at one or more locations on a construction site using a known measurement for establishing a first elevation in relation to a benchmark elevation, where the distance between the first and second elevations is constant.

In the illustrated embodiment, the measuring attachment 70 includes a bracket 71 mountable to the leveling rod and adapted for movement there along, the bracket 71 including means for identifying a first position relative to the measuring scale of the measuring insert 35; and an elongated rail member 73 extending from the bracket 71 in a direction generally parallel to the axis of movement of the bracket 71 along the leveling rod, the rail member 73 including means for identifying at least a second position selectively moveably positionable along the length of the rail member 73 to selectively identify a second position along the measuring scale of the measuring insert 35 that is different from the first position.

As shown, the bracket 71 has opposite sidewalls 75 interconnected by an intermediate wall 76 spanning the front surface 21 of the sliding rail member 20. The sidewalls 75 define an opening therebetween for receiving therein the sliding rail member 20. The intermediate wall 76 includes a reading window 77 dimensioned to permit viewing a portion of the measuring insert 35. To facilitate sliding positioning of the bracket 71 along the rail member 20 in a plurality of positions, a leg portion 81 is provided that is complementary to the cross-section of the lateral track 26 and slidingly receivable therein. The leg portion 81 is threadingly associated with a thumb screw 82 extending through a sidewall 75 of the bracket 71. By threadingly tightening or loosening the thumb screw 82 relative to the leg portion 81, the bracket 71 may be selectively fixed in place or sidably moved along the rail member 20, respectively, all in known fashion.

For use in conjunction with a laser-leveling instrument, the bracket 71 may be adapted to mount a laser-beam receiver (not shown), for instance on one of the sidewalls 75. According to such embodiment of the invention, it will be appreciated that the means for identifying a first position relative to the measuring scale may comprise the laser-beam receiver itself, which receiver is simply positioned along the leveling rod until the receiver is aligned with the laser-beam leveling instrument proximate the desired measurement. When employed in conjunction with an optical-sight type leveling instrument, the bracket 71 may comprise a pointer 72 or like means to facilitate visual alignment with the desired measurement on the measuring scale.

As will also be appreciated with reference to the remainder of this disclosure, the bracket 71 as shown may be substituted with commercially available brackets, including those as identified hereinabove, including, without limitation, those of the mechanically clamping variety, as well as brackets adapted for sliding interconnection with a track provided on the leveling rod.

Still referring to FIG. 9, the rail member 73 will be seen to comprise, in the illustrated embodiment, an elongated rod secured to a mounting block 79 that is, in turn, mounted to one of the sidewalls 72. The rail member 73 is oriented generally parallel to the longitudinal axis of the sliding rail member 20, and so also to the axis of movement of the bracket 71. The means for identifying at least a second position, according to the illustrated embodiment, will be seen to comprise an indicator 74. To permit identification of multiple second positions along the length of the measuring insert 35, the indicator 74 is selectively positionable along the length of the rod 75. It will of course be appreciated that more than one indicator 74 as shown may be provided on the rail member 73, for instance when it is necessary to automatically determine elevations for three or even more locations whose relative spacing is constant.

Preferably, though not necessarily, the elongated rail member 73 is adapted for removable connection to the bracket 71. According to this embodiment, those of skill will appreciate that the bracket 71 may comprise any conventional, commercially available laser-beam detector, such as described above, which has been modified to mount the rail member 73 by known means, including, by way of example, hook and loop type fasteners, nuts and bolts, screws, etc.

Also according to this embodiment, it is preferred that the rail member 73 be adapted for removable connection to the bracket in at least a first position, wherein the rail member 73 extends away from the bracket 71 in a first direction generally parallel to the axis of movement of the bracket 71, and at least a second position, wherein the rail member 73 extends away from the bracket 71 in a second direction. In this fashion, the measuring attachment of this invention may be used to automatically obtain additional measurements corresponding to either additions to or subtractions from a first measurement. In the illustrated embodiment, the preferred alternate orienting of the rail member 73 is facilitated by mounting the rail member 73 in a cylindrical sleeve provided through the mounting block 79, the sleeve being dimensioned to removably receive therein the rail member 73 therein. A threaded bore communicates with the cylindrical passageway, the threaded bore receiving an adjustable lock screw 80 that is selectively positionable within the passageway to engage the rail member 73. By releasing the engagement of the lock screw 80 on the rail member 73, the rail member 73 may be withdrawn from and subsequently reoriented in the cylindrical passageway in a desired direction. Again, however, those of skill will understand that the particular means provided for removably mounting and altering the orientation of the rail member 73 may vary without departing from the broader aspects of this invention.

By written description of its exemplary employment, the measuring attachment described above will be better understood.

Generally, the measuring attachment is employed in conjunction with both a leveling instrument and a single leveling rod, including, for example, a leveling rod of the type disclosed herein, to automatically establish at least a second elevation at one or more locations on a construction site using a known measurement for establishing a first elevation in relation to a benchmark elevation, where the distance between the first and second elevations is constant.

According to this methodology, the means for identifying at least a second position along the measuring scale are fixedly positioned a predetermined distance from the means for identifying the first position corresponding to the constant distance between the first and second elevations; the leveling rod is calibrated with the leveling instrument by placing the foot of the leveling rod on the benchmark elevation, and the means for identifying the first position is adjusted to a position on the measuring scale corresponding to a starting position, for instance "zero"; the means for identifying the first position are adjusted to a position on the measuring scale corresponding to the known measurement for establishing a first elevation in relation to the benchmark elevation; and the at least second elevation is thereafter established at the one or more locations by adjusting the means for identifying the at least second position to a position on the measuring scale corresponding to the known measurement for establishing the first elevation in relation to the benchmark elevation, positioning the foot of the leveling rod on a support surface at the one or more locations, and modifying the elevation at the one or more locations as necessary until the means for identifying the at least second position are aligned with the leveling instrument.

Taking as an exemplary application the task of constructing a road using the leveling rod of this invention and a laser-beam leveling instrument, in order to better understand the manner of employing the measuring attachment outlined above, it is necessary in connection with such a task to determine the depth of pavement and stone in relation to the top surface of the pavement. For this example, assume a depth of pavement of 4 inches, and an underlayment of crushed stone having a depth of 6 inches.

At a given location where a survey stake or other means provide a benchmark elevation as well as a known measurement for establishing a first elevation (here, the top surface of the pavement), a worker will calibrate the leveling rod to the benchmark elevation using the leveling instrument by placing the foot portion of the base rail on the stake, adjusting the means for identifying a first position relative to the measuring scale of the measuring insert (in this example a laser-beam receiver mounted to the bracket) to identify the zero or other defined starting-point on the measuring scale, and moving the sliding rail relative to the base rail until the laser-beam receiver provides audible and/or visual signals indicating that the laser-beam receiver is aligned with the leveling instrument. The position of the sliding rail member along the base rail member is subsequently fixed, and the bracket is advanced along the measuring device until the laser-beam receiver is aligned to a position on the measuring insert corresponding to the known measurement provided by the survey stake.

As there are provided two measurements, both depth of pavement and depth of crushed stone, to be determined in relation to the first measurement, this example describes the employment of two indicators provided on the rail member. One of these indicators is positioned along the rail member a distance relative to the position of the receiver (or other means for identifying a first position) that is equal to the known depth of pavement (i.e., 4 inches), while the other of these indicators is positioned along the rail member a distance relative to the position of the receiver that is equal to the known depth of the stone underlayment (i.e., 6 inches). Positioning of these indicators may be undertaken when the leveling rod is calibrated, using the measuring scale on the measuring insert. Alternatively, the indicators may be positioned beforehand, employing the measuring scale on the measuring insert or another measuring device, including, by way of example, a tape measure, yardstick, etc.

Using the position on the measuring insert corresponding to the first position (i.e., the known measurement identified for establishing the elevation of the top of pavement), the construction worker has only to move the bracket along the leveling rod to position the indicators identifying the depth of pavement and depth of stone, as desired, at the position on the measuring insert corresponding to the first position in order to effectively change the position of the laser-beam receiver and thereby permit the determination of elevations for the depth of pavement and/or depth of stone using the same laser-beam receiver, all without the need for mathematical computation by the worker.

It will be appreciated from the above disclosure that the present invention improves upon the prior art by providing a leveling rod, and attachments therefor, that are at once easy to use, particularly for unskilled individuals, and which combine robust construction with a simple and economical design.

Of course, the foregoing is merely illustrative of the present invention; those of ordinary skill in the art will appreciate that many additions and modifications to the present invention, as set out in this disclosure, are possible without departing from the spirit and broader aspects of this invention as defined in the appended claims.

The invention in which an exclusive property or privilege is claimed is defined as follows:

1. A leveling rod, comprising:
    an elongated base rail member having opposing front and rear longitudinal surfaces, an upper end, and a lower end comprising a foot portion;
    an elongated sliding rail member having opposing front and rear surfaces, and upper and lower ends;
    the front surface of the base rail member and the rear surface of the sliding rail member each having one or the other of complementary tongue and groove portions whereby the base and sliding rail members are slidingly interconnected in lapped relation, and the sliding rail member further being selectively fixedly positionable along the base rail member in a plurality of positions; and
    a plurality of elongated, self-supporting measuring inserts, said inserts being interchangeably removably securable to the front surface of the sliding rail member.

2. The leveling rod of claim 1, further comprising a cut attachment including first and second hingedly connected longitudinal segments, the cut attachment being characterized by a folded condition, wherein the first and second segments are arranged in lapped relation, and an unfolded condition, wherein the first and second segments are arranged end-to-end;
    wherein the first segment and the base rail member each have one or the other of complementary tongue and groove portions whereby the first segment is slidingly interconnectable with the base rail member in lapped relation; and
    wherein further the first segment is selectively fixedly positionable along the base rail member in a plurality of positions.

3. The leveling rod of claim 2, wherein the cut attachment further comprises a measuring scale provided on the second segment.

4. The leveling rod of claim 3, wherein the first and second segments are each provided with complementary, removably-interengageable elements that are interengaged in the folded condition of the cut attachment.

5. The leveling rod of claim 4, wherein the complementary, removably-interengageable elements comprise a magnet provided on one of the first or second segments, and a magnetically attractable member provided on the other of the first or second segments.

6. The leveling rod of claim 1, wherein at least one of the lateral sides of the sliding rail member further comprises a longitudinally extending, lateral track adapted to slidingly receive therein a laser-beam detector.

7. A cut attachment for use in conjunction with a leveling rod, the cut attachment comprising:

first and second hingedly connected longitudinal segments, the cut attachment being characterized by a folded condition, wherein the first and second segments are arranged in lapped relation, and an unfolded condition, wherein the first and second segments are arranged end-to-end; and the first segment adapted for sliding interconnection with a leveling rod in lapped relation, and the entire first segment further being selectively fixedly positionable in a plurality of positions along a leveling rod.

8. The cut attachment of claim 7, further comprising a measuring scale provided on the second segment.

9. The cut attachment of claim 7, wherein the first and second segments are each provided with complementary, removably-interengageable elements that are interengaged in the folded condition of the cut attachment.

10. The cut attachment of claim 9, wherein the complementary, removably-interengageable elements comprise a magnet provided on one of the first or second segments, and a magnetically attractable member provided on the other of the first or second segments.

11. A method for using a leveling instrument and a leveling rod to establish at least one predetermined elevation relative to a benchmark elevation at one or more locations on a construction site without the need for mathematical computations, the method comprising the steps of:

providing a leveling rod comprising elongated base and sliding rail members slidingly interconnected in lapped relation, the sliding rail member being selectively fixedly positionable along the base rail member in a plurality of positions, the base rail member having opposing front and rear longitudinal surfaces, an upper end, and a lower end comprising a foot portion, and the sliding rail member having opposing front and rear surfaces, and upper and lower ends;

providing at least one elongated, self-supporting, blank measuring insert removably mateable with the front surface of the sliding rail member;

providing on the measuring insert only indicia for identifying the relative positions of the benchmark elevation and the at least one predetermined elevation;

calibrating the leveling rod to the benchmark elevation by positioning the foot portion of the leveling rod on the benchmark elevation, and slidingly moving the sliding rail member along the base rail member until the indicia on the measuring insert corresponding to the benchmark elevation is aligned with the leveling instrument; and establishing the at least one predetermined elevation at one or more locations on the construction site by positioning the foot portion of the leveling rod on a support surface at each of the one or more locations, and modifying the elevation of the support surface until the indicia on the measuring insert corresponding to the at least one predetermined elevation is aligned with the leveling instrument.

12. The method of claim 11, wherein the step of providing indicia on the measuring insert comprises providing non-numeric indicia.

13. The method of claim 11, wherein the step of providing indicia on the measuring insert comprises providing alphabetic indicia.

14. The method of claim 11, wherein the step of providing indicia on the measuring insert comprises providing symbolic indicia.

15. A measuring attachment for use in conjunction with an elongated leveling rod of the type having a measuring scale, the measuring attachment comprising:

a bracket mountable to a leveling rod and adapted for longitudinal sliding movement therealong, the bracket including an indicator for identifying a first position on the measuring scale; and an elongated rail member extending from the bracket in a direction generally parallel to the axis of movement of the bracket along the leveling rod, the rail member including at least one indicator for identifying at least a second position that is different from the first position, the at least one indicator for identifying the at least second position being selectively positionable along the rail.

16. The measuring device of claim 15, wherein the elongated rail member is removably connectable to the bracket.

17. The measuring attachment of claim 16, wherein the elongated rail member is alternately removably connectable to the bracket in at least a first position, wherein the rail member extends away from the bracket in a first direction generally parallel to the axis of movement of the bracket, and at least a second position, wherein the rail member extends away from the bracket in a second direction.

18. A method for employing both a leveling instrument and a single leveling rod to automatically establish at least a second elevation at one or more locations on a construction site using a known measurement for establishing a first elevation in relation to a benchmark elevation, where the distance between the first and at least second elevations is constant, the method comprising the steps of:

providing a leveling rod having a lower end comprising a foot portion, and a measuring scale;

providing a measuring attachment for the leveling rod, the measuring attachment comprising a bracket mountable to the leveling rod and adapted for longitudinal sliding movement there along, the bracket including an indicator for identifying a first position on the measuring scale corresponding to a known measurement for establishing a first elevation, and an elongated rail member extending from the bracket in a direction generally parallel to the axis of movement of the bracket along the leveling rod, the rail member including at least one indicator for identifying at least a second position that is different from the first position, the at least one indicator being selectively positionable along the rail;

fixedly positioning the at least one indicator a predetermined distance from the indicator for identifying the first position corresponding to the constant distance between the first and at least second elevations;

calibrating the leveling rod with the leveling instrument by placing the foot of the leveling rod on the benchmark elevation, and adjusting the indicator for identifying the first position to a position on the measuring scale corresponding to a starting position;

adjusting the indicator for identifying the first position to a position on the measuring scale corresponding to the known measurement for establishing the first elevation in relation to the benchmark elevation; and establishing the at least second elevation at one or more locations by adjusting the position of the measuring attachment to bring the at least one indicator for identifying the at least second position to a position on the measuring scale corresponding to the known measurement for establishing the first elevation in relation to the benchmark elevation, positioning the foot of the leveling rod on a support surface at the one or more locations, and modifying the elevation at the one or more locations as necessary until the indicator for identifying the first position is aligned with the leveling instrument.

19. The method of claim 18, wherein the leveling instrument is a laser-leveling instrument, and wherein further:

The step of providing a measuring attachment includes providing a laser receiver on the bracket, the laser receiver and the indicator for identifying a first position being positioned relative to each other such that, when the laser receiver is aligned with a laser leveling instrument, the laser receiver and the indicator for identifying a first position are at approximately the same elevation; and wherein the step of establishing the at least second elevation at one or more locations comprises modifying the elevation at the one or more locations as necessary until the laser receiver is aligned with the leveling instrument.

20. A method for employing both a leveling instrument and a single leveling rod to automatically establish a lower elevation at one or more locations on a construction site using a known measurement provided for establishing a first elevation in relation to a benchmark elevation, where the distance between the lower and higher elevations is constant, the method comprising the steps of:

providing a leveling rod having a lower end comprising a foot portion, and a measuring scale;

providing a cut attachment including first and second hingedly connected segments, the first segment being slidingly interconnectable to the leveling rod and selectively fixedly positionable in a plurality of positions along the leveling rod, the cut attachment being characterized by a folded condition, wherein the first and second segments are arranged in lapped relation, and an unfolded condition, wherein the first and second segments are arranged end-to-end, and the second segment having a lower end comprising a foot portion;

fixedly positioning the first segment along the leveling rod such that, in the folded condition of the cut attachment, the second segment does not extend beyond the lower end of the leveling rod, and in the unfolded condition of the cut attachment, the second segment extends beyond the lower end of the leveling rod a distance that is equal to the distance between the higher and lower elevations;

with the cut attachment in the folded condition thereof, calibrating the leveling rod with the leveling instrument by placing the foot of the leveling rod on the benchmark elevation, and aligning the leveling instrument with a position on the measuring scale corresponding to a starting position;

identifying on the measuring scale of the leveling rod a position corresponding to the known measurement for establishing the higher elevation; and establishing the lower elevation by placing the cut attachment in the unfolded condition thereof, positioning the foot portion of the second segment on a support surface at the one or more locations, and modifying the elevation at the one or more locations as necessary until the position on the measuring device corresponding to the known measurement for establishing the higher elevation is aligned with the leveling instrument.

21. A leveling rod, comprising:

an elongated base rail member having opposing front and rear longitudinal surfaces, an upper end, and a lower end comprising a foot portion;

an elongated sliding rail member having opposing front and rear surfaces, and upper and lower ends;

the front surface of the base rail member and the rear surface of the sliding rail member each having one or the other of complementary tongue and groove portions whereby the base and sliding rail members are slidingly interconnected in lapped relation, and the sliding rail member further being selectively fixedly positionable along the base rail member in a plurality of positions; and an elongated, self-supporting measuring insert removably mateable with the front surface of the sliding rail member a cut attachment including first and second hingedly connected longitudinal segments, the cut attachment being characterized by a folded condition, wherein the first and second segments are arranged in lapped relation, and an unfolded condition, wherein the first and second segments are arranged end-to-end;

wherein the first segment and the base rail member each have one or the other of complementary tongue and groove portions whereby the first segment is slidingly interconnectable with the base rail member in lapped relation; and wherein further the first segment is selectively fixedly positionable along the base rail member in a plurality of positions.

22. The leveling rod of claim 21, wherein the cut attachment further comprises a measuring scale provided on the second segment.

23. The leveling rod of claim 22, wherein the first and second segments are each provided with complementary, removably-interengageable a>elements that are interengaged in the folded condition of the cut attachment.

24. The leveling rod of claims 23, wherein the complementary, removably-interengageable elements comprise a magnet provided on one of the first or second segments, and a magnetically attractable member provided on the other of the first or second segments.

* * * * *

UNITED STATES PATENT AND TRADEMARK OFFICE
CERTIFICATE OF CORRECTION

PATENT NO.    : 6,662,458 B1
DATED         : December 16, 2003
INVENTOR(S)   : Antonelli It is certified that error appears in the above-identified patent and that said Letters Patent is hereby corrected as shown below:

Column 3,
Line 42, please delete "once-economical" and insert -- once economical --;

Column 5,
Line 53, please delete "there along" and insert -- therealong --;

Column 6,
Line 20, please delete "there along" and insert -- therealong --;

Column 10,
Line 19, please delete "pre-determined-grades" and insert -- pre-determined grades --;

Column 13,
Line 35, please delete "there along" and insert -- therealong --;
Line 60, please delete "sidably" and insert -- slidably --;

Column 18,
Line 55, please delete "there along" and insert -- therealong --;

Column 20,
Line 54, please delete "a>elements" and insert -- elements --; and
Line 56, please delete "claims" and insert -- claim --.

Signed and Sealed this

Twenty-fourth Day of February, 2004

JON W. DUDAS
*Acting Director of the United States Patent and Trademark Office*